United States Patent [19]

Shepherd

[11] Patent Number: 4,800,188

[45] Date of Patent: Jan. 24, 1989

[54] METHOD FOR SUPPORTING METALLOPORPHYRINS ON POLYBENZIMIDAZOLE POROUS ARTICLES

[75] Inventor: James P. Shepherd, Springfield, N.J.

[73] Assignee: Hoechst Celanese Corp., Somerville, N.J.

[21] Appl. No.: 28,353

[22] Filed: Mar. 20, 1987

[51] Int. Cl.[4] .......................... B01J 31/06; C08J 9/36
[52] U.S. Cl. .................................. 502/159; 502/163; 502/402; 521/53; 525/417; 428/98; 428/375; 428/389; 428/394; 428/403; 428/407; 428/409
[58] Field of Search ...................... 502/159, 163, 402; 521/53; 525/417; 428/98, 375, 389, 394, 403, 407, 409

[56] References Cited

U.S. PATENT DOCUMENTS

| | | | |
|---|---|---|---|
| 2,966,453 | 12/1960 | Gleim et al. | 502/163 X |
| 4,066,705 | 1/1978 | Hughes | 502/159 X |
| 4,077,906 | 3/1978 | Hughes | 502/159 |
| 4,206,043 | 6/1980 | Carlson | 502/163 X |
| 4,271,038 | 6/1981 | Pesa et al. | 502/163 X |

FOREIGN PATENT DOCUMENTS

| | | | |
|---|---|---|---|
| 2006347 | 8/1970 | Fed. Rep. of Germany | 502/163 |
| 0127384 | 10/1981 | Japan | 502/163 |

OTHER PUBLICATIONS

Groves & Nemo: Aliphatic Hydroxylation Catalyzed by Iron Porphyrin Complexes: J. Am. Chem. S., vol. 105, pp. 6243–6248 (1983).
Tabushi & Morimitsu; Stereospecific; Regioselective & Catalytic Monoepoxidation, etc.; J. Amer. Chem. S., vol. 106, pp. 6871–6872, (1984).

*Primary Examiner*—Patrick P. Garvin
*Attorney, Agent, or Firm*—Lynch, Cox, Gilman & Mahan

[57] ABSTRACT

A method for supporting metalloporphyrins on polybenzimidazole articles is disclosed herein. Microporous polybenzimidazole articles are treated with a strong base to produce an anionized polybenzimidazole article. A metalloporphyrin salt is dissolved in a solvent and is mixed with the anionized polybenzimidazole article to produce a microporous polybenzimidazole metalloporphyrin complex. This compound can be used in the selective oxidation of alkanes, olefins and aromatic compounds and is quite useful in the separation of oxygen from a gas stream. An alternative method of forming this complex by mixing directly the polybenzimidazole particulate with a weak metalloporphyrin salt without the use of a strong base results in lower percentages of substitution then does the principal method.

37 Claims, No Drawings

METHOD FOR SUPPORTING METALLOPORPHYRINS ON POLYBENZIMIDAZOLE POROUS ARTICLES

BACKGROUND OF INVENTION

1. Field of Invention

This invention relates to a process for the production of polybenzimidazole microporous products. In particular this invention relates to a method for preparing catalysts which are bound into a microporous polybenzimidazole structure.

2. Prior Art

It is recognized that polybenzimidazoles in general, and aromatic polybenzimidazoles in particular, are characterized by a high degree of thermal and chemical stability. To utilize these advantages, polybenzimidazole polymers have been formed into many shaped articles including fibers, membranes, films and particulates. For example, polybenzimidazole fibers have been used to support catalysts useful in hydroformylation reactions. Examples of these catalysts include a rhodium carbonyl complex attached to a polybenzimidazole fiber support. See U.S. Pat. Nos. 4,066,705 and 4,077,906.

The particulate form of polybenzimidazole has been disclosed in U.S. Pat. Nos. 3,408,336, 3,560,158, 4,394,500 and 4,460,763. In addition, crosslinked bead copolymers of polybenzimidazole prepared by pearl copolymerization of 4-vinylpyridine, styrene, and divinylbenzene functionalized by reactions with various acids have been suggested for use as reagents in polymer supported chemical reactions and as acid scavengers in non-aqueous systems. (See *Journal of Macromolecular Science—Chemistry*, Vol. 11(3), pp. 515–534, (1977); and *Journal of Organic Chemistry*, Vol. 43, No. 13, pp. 2618–2621, (1978).

Recently, extensive research has been devoted to discovering compounds which are useful in absorbing or desorbing specific gases. In particular, various processes have also been disclosed for the manufacture of metal complexes capable of absorbing oxygen. For example, metal porphyrin complexes have been prepared which are oxygen absorbing and desorbing agents. See U.S. Pat. Nos. 4,104,466 and 4,530,794; J. P. Collman et al., *Journal of the American Chemical Society*, Vol. 97, pp. 1427–1439 (1975); and E. Hasegawa et al ., Bio-Chemical and *Bio-Physical Research Communications*, Vol. 105, p. 1416 (1982).

It is also well known that iron porphyrin complexes are useful as catalysts for oxidation of unactivated alkanes such as cyclohexane and cycloheptane. See Groves et al ., *Journal of the American Chemical Society*, Vol. 105, pp. 6243–48 (1983) and Tabushi et al., *Journal of the American Chemical Society*, Vol. 106, pp. 6871–72 (1984).

An additional metalloporphyrin catalyst is disclosed in W. Drenth, *Journal of the Chemical Society, Chemical Communications*, pp. 1204–1206 (1983) wherein a metalloporphyrin catalyst is anchored to a rigid polymer support for the enhancement of cyclohexene epoxidation reactions. The particular catalyst is a manganese porphyrin linked to a polyisocyanate polymer. However, the linkage of the porphyrin to the rigid polymer occurs through the phenyl groups on the porphyrin ring rather than through the metal. This linkage results in a less efficient epoxidation reaction than does the direct linkage with the metalloporphyrin metal.

In particular, there is no disclosure of the chemical binding of a metalloporphyrin to a polybenzimidazole article for use as a catalyst.

It is therefore an object of the invention to disclose a process for the chemical binding of metalloporphyrins to polybenzimidazole articles.

It is a further object of the invention to produce metalloporphyrin polybenzimidazole catalysts.

It is a still further object of the invention to disclose a process for the production of metalloporphyrin polybenzimidazole polymer beads useful as catalysts in epoxidation reactions.

These and other objects as well as the scope, nature and utilization of this invention will be apparent to those skilled in the art from the following detailed description and appended claims.

SUMMARY OF THE INVENTION

The process of the present invention comprises the following steps:

(a) preparing a microporous polybenzimidazole shaped article;

(b) reacting the microporous polybenzimidazole article with a strong base to form polybenzimidazole anions on the surface of the article; and (c) mixing a metalloporphyrin complex with the microporous polybenzimidazole anion containing articles to produce a microporous polybenzimidazole article which supports a metalloporphyrin complex.

These metalloporphyrin complexes supported by a polybenzimidazole article can function as heterogeneous catalysts for the selective oxidation of alkanes, olefins and aromatic compounds and are useful in absorbing oxygen from a gas stream. In addition these catalysts, when supported on polybenzimidazole films, are useful in the purification or enrichment of gas mixtures. Supporting metalloporphyrins on polybenzimidazole articles, such as microporous beads, permits them to be used as heterogeneous catalysts in either slurry or vapor phase reactions. The natural stability of polybenzimidazole articles enhances the use of the metalloporphyrin complexes.

DETAILED DESCRIPTION OF INVENTION

A. Preparing the Polybenzimidazole Polymer Starting Material

The polybenzimidazoles useful in the production of the polybenzimidazole microporous particulates of this invention may comprise any polybenzimidazole polymer known to those skilled in the art. Typical polymers of this class and their preparation are more fully described in U.S. Pat. No. 2,895,948; U.S. Pat. No. Re 26,065, and in the *Journal of Polymer Science*, Vol. 50, pp. 511–539 (1961), which are herein incorporated by reference. The polybenzimidazoles consist essentially of recurring units of the following Formula I and II. Formula I is:

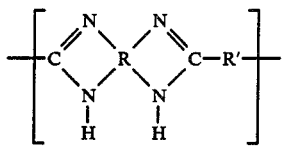

wherein R is a tetravalent aromatic nucleus, preferably symmetrically substituted, with the nitrogen atoms forming benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

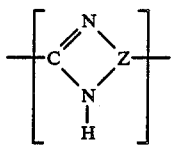

wherein Z is an aromatic nucleus having the nitrogen atoms forming the benzimidazole ring paired upon adjacent carbon atoms of the aromatic nucleus.

Preferably, aromatic polybenzimidazoles are selected, e.g., polymers consisting essentially of the recurring units of Formulas I and II, wherein R' is at least one aromatic ring or heterocyclic ring.

As set forth in U.S. Pat. No. Re 26,065, the aromatic polybenzimidazoles having the recurring units of Formula II may be prepared by self-condensing a trifunctional aromatic compound containing only a single set of ortho-disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patents, the aromatic polybenzimidazoles having the recurring units of Formula I may be prepared by condensing an aromatic tetraamine compound containing a pair of ortho-diamino substituents on the aromatic nucleus with a dicarboxyl compound selected from the class consisting of (a) the aromatic/aliphatic esters of an aromatic dicarboxylic acid, (b) the aromatic/aliphatic esters of a heterocyclic dicarboxylic acid wherein the carboxyl groups are substituents upon a carbon in a ring compound selected from the class consisting of pyridine, pyrazine, furan, quinoline, thiophene and pyran, (c) an anhydride of an aromatic dicarboxylic acid, and (d) a free aromatic or aliphatic dicarboxylic acid.

Examples of polybenzimidazoles which have the recurring structure of Formula I are as follows:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2',2'-(m-phenylene)-5,5'-di(benzimidazole) methane;
poly-2',2"(m-phenylene)-5',5"-di(benzimidazole) propane-2,2; and
poly-2',2"-(m-phenylene)-5',5"-di(benzimidazole) ethylene-1,2 where the double bonds of the ethylene groups are intact in the final polymer.

The preferred polybenzimidazole for use in the present invention is poly-2,2'-(m-phenylene)-5,5'-bibenzimidazole, the recurring unit of which is:

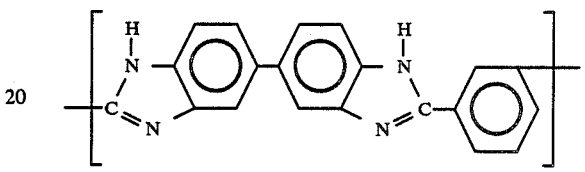

Any polymerization process known to those skilled in the art may be employed to prepare the polybenzimidazole employed herein. Representative techniques for preparing polybenzimidazoles are disclosed in U.S. Pat. Nos. 3,509,108, 3,549,603 and 3,551,389 which are assigned to the assignee of the present invention and are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3, the inherent viscosity (I.V.) as used herein being determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, or at least 0.6, e.g., 0.8 to 1.1 or more.

The temperature employed in the second stage is at least 250° C., preferably at least 325° C., and more preferably from about 350° C. to 425° C. The second stage reaction generally takes at least 0.5 hours, and preferably from about 1 to 4 hours or more.

A particularly preferred method for preparing the polybenzimidazole is disclosed in the aforesaid U.S. Pat. No. 3,509,108. As disclosed therein, aromatic polybenzimidazoles may be prepared by initially reacting the monomer in a melt phase polymerization at a temperature above about 200° C. and a pressure above 50 psi (e.g., 300 to 600 psi) and then heating the resulting reaction product in a solid state polymerization at a temperature above about 300° C. (e.g., 350° to 500° C.) to yield the final product.

Although the preferred polybenzimidazole article used in the instant invention is a microporous particulate, the article may also be in the form of fibers or films. Any conventional process well known to those in the art may be employed for the production of the polybenzimidazole fibers or films.

B. Microporous Particulate Formation

The microporous polybenzimidazole particulates of this invention are prepared either by emulsification-precipitation or by atomizing, non-solvent, quenching procedures. As used herein the term "atomizing" is employed in a generic sense to refer to any procedures of the type wherein a solution of polybenzimidazole resin is converted into a stream of droplets, including, for example, by spraying, dripping, etc., as well as various other procedures as would be apparent to those skilled in the art.

In the first step of the emulsification-precipitation technique, the polybenzimidazole resin is dissolved in a suitable solvent in order to provide a polybenzimidazole solution or dope comprising less than about 10 percent by weight polybenzimidazole, and preferably from about 2 to about 10 percent polybenzimidazole.

The solvents utilized to form the polybenzimidazole polymer solutions include those solvents which are commonly recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethylacetamide, N,N-dimethylformamide, dimethylsulfoxide, and N-methyl-2-pyrrolidone. Additional representative solvents include formic acid, acetic acid, and sulfuric acid. Particularly preferred solvents comprise N,N-dimethylacetamide and concentrated sulfuric acid having a concentration of from about 90 to 100 percent and preferably about 98 percent by weight.

One suitable method for dissolving the polybenzimidazole polymer in the solvent is by mixing the materials at a temperature above the normal boiling point of the solvent, for example, about 25 to 120° C. above such boiling point, and at a pressure of 2 to 15 atmospheres for a period of 1 to 5 hours. Preferred conditions will usually entail heating the mixture in a stainless steel reactor at a pressure of about 7 atmospheres for 2 hours at a temperature of about 235° C. The resulting solution is then preferably filtered to remove any undissolved polymer. A minor amount of lithium chloride, e.g. about 2 percent by weight, optionally, may be provided in the solution in order to prevent the polybenzimidazole polymer from phasing out of the solution upon standing for extended periods of time.

The resulting polybenzimidazole dope or solution is then emulsified with a non-polar organic solvent. Preferred non-polar organic solvents include straight chain $C_8$ or higher aliphatic petroleum solvents such as octane as well as halogenated solvents such as perchloroethylene. The ratio of polybenzimidazole solution to the non-polar organic solvent is critical to the preparation of a stable emulsion. Typically, this ratio will comprise, on a volume basis, from about 1:2 to about 1:4 parts polybenzimidazole solution to non-polar organic solvent, and preferably from about 1:2.5 to 1:4 parts polybenzimidazole solution to non-polar organic solvent.

In order to improve the stability of the emulsion, a minor amount of a surfactant having a polarity intermediate between the polybenzimidazole solution and the non-polar organic solvent may be added to the emulsion. Such surfactants are well known to those skilled in the art, and include polyoxyalkylene derivatives of hexitol anhydride, partial long chain fatty acid esters and partial esters of the common fatty acids such as lauric, palmitic, stearic and oleic acids, and hexitol anhydrides, i.e., hexitanes and hexides derived from sorbitol. Where a surfactant is employed, the amount utilized will generally range from about 0.01 to about 2 percent by weight, and preferably from about 0.1 to 1 percent by weight, based on the total weight of the solution.

In addition to a surfactant, the emulsion may also contain a minor amount, e.g., less than about 5 percent by weight of an additive which enhances formation of the microporous structure of the polybenzimidazole particulates. Suitable additives comprise compounds which are either insoluble or soluble in the solvent used to prepare the polybenzimidazole solution and are capable of being extracted from the polybenzimidazole particulates by washing with aqueous or organic solvent or are thermally removable by treatment with hot gases, such as $N_2$ or air. Examples of such soluble additives include polyethylene oxide resins, polypropylene oxide resins, polybutylene oxide resins, and lithium chloride or similar metal salts. Examples of such insoluble additives include silica gel, lithium acetate, lithium stearate or similar metal salts, and polyethylene oxide polymers. The use of such additives not only improves the porosity of the final polybenzimidazole microporous particulates, but, in addition, promotes the formation of a macroreticular structure.

Formation of the emulsion requires mixing conditions of strong shear. Satisfactory mixing conditions will include a shear sufficient to form a homogeneous dispersion of small substantially spherical droplets of polybenzimidazole resin.

Following emulsification, the emulsified solution is contacted with a non-solvent in order to precipitate the polybenzimidazole in the form of substantially spherical polymer particles. Non-solvents useful for this purpose comprise materials which are relatively immiscible (relative to water) with the polybenzimidazole solution. Preferred non-solvents include aliphatic alcohols having 1 to 4 carbon atoms, of which methanol is particularly preferred. The amount of non-solvent employed is not critical and generally comprises from about 1 to 100 parts of non-solvent per part of polybenzimidazole solution present in the emulsion. Where desired, the non-solvent may also include from about 0.01 to about 2 percent by weight of a surfactant, such as those discussed above, in order to avoid agglomeration of the precipitated beads and to retain the fine, spherical structure thereof.

Following precipitation, the final microporous polybenzimidazole particulates are recovered by filtering, washing with an aqueous solution, preferably water or an aqueous alcohol solution, and then dried at a temperature of from about 60° to about 120° C. for from about 2 to about 12 hours.

In an alternative embodiment, the microporous polybenzimidazole particulates of this invention are prepared by an atomizing-non-solvent quenching procedure. In the first step of this procedure, a solution of polybenzimidazole resin in a suitable solvent (preferably concentrated sulfuric acid or N,N-dimethylacetamide)

containing from about 2 to 20 percent by weight, and preferably from about 10 to 20 percent by weight of the polybenzimidazole resin, is prepared as described in detail above. Optionally, this solution may also contain up to about 2 percent by weight of lithium chloride in order to stabilize the solution; up to about 5 percent by weight of one or more of the aforementioned soluble types of pore forming additives; and up to about 2 percent by weight, and preferably from about 0.1 to 1 percent by weight of a suitable surfactant, such as those discussed previously, in order to improve the flow of the polybenzimidazole solution through the atomizing apparatus. The particular polybenzimidazole concentration selected within the aforementioned range is dictated by the desired characteristics of the finished microporous particulates, as well as the practical viscosity limitations imposed by the atomizing apparatus.

The resulting polybenzimidazole solution is then converted into a stream of small, fine liquid droplets. Any procedure well known to those skilled in the art may be employed for this purpose. For example, the polybenzimidazole solution may be sprayed through an air, airless, or ultrasonic nozzle. Alternatively, the polybenzimidazole solution may be dripped, impinged upon rotating atomizer plates, etc. The particular technique used for this step is not critical provided that a stream of small, finely divided droplets is obtained. The flow rate of the polybenzimidazole solution, pressure air flow (where employed), etc., through the atomizing device is adjusted in order to achieve the aforementioned stream of finely divided liquid droplets of polybenzimidazole solution. Such conditions will vary depending upon the particular type of atomizing device employed. Where an air spray type device is used, typical operating conditions include a polybenzimidazole solution flow rate of from about 0.1 to 3 gallons/hour, and preferably from about 0.5 to 1.0 gallons/hour; a pressure of from about 10 to 100 psi preferably from about 25 to 50 psi; and a nozzle diameter of from about 0.1 to 0.8 inches. Preferred air spray devices include a centrally positioned nozzle, such as air sprayers marketed by Spraying Systems Company, Bellwood, Illinois (Set-up 1A). Typical airless sprayers useful herein include conventional airless paint sprayers such as those marketed by the Wagner Company, Minneapolis, Minnesota.

Following atomization of the polybenzimidazole solution, the stream of liquid droplets is quenched with a non-solvent under conditions such that the liquid droplets are converted into substantially spherical beads of solidified microporous polybenzimidazole resin. For this purpose, the polybenzimidazole solution is typically sprayed or dripped in a downward direction into a bath of non-solvent, disposed at a distance of 12 to 30, and preferably 15 to 20, inches below the nozzle of the atomizing device. It is essential that the particular height for the nozzle chosen be adequate to permit the formation of small finely divided droplets of polybenzimidazole solution prior to contacting the non-solvent. The non-solvent may comprise any of the familiar non-solvents for polybenzimidazole, such as alcohols having from 1 to 4 carbon atoms, and particularly methanol, and may include a small amount, up to about 2 percent by weight of a surfactant in order to prevent agglomeration of the polybenzimidazole particulates. The temperature and time conditions employed during the quenching step can vary over wide ranges and typically include temperatures of from about 5° to 80° C. and times of from about a few seconds to several minutes or longer. The particular conditions chosen are not critical, provided adequate coagulation of the polybenzimidazole polymer is obtained.

Following quenching, the resulting solidified beads of microporous polybenzimidazole resin are recovered by filtration, washed with water or aqueous alcohol solutions, and dried as described in detail above.

The polybenzimidazole produced by the foregoing procedures comprise substantially spherical beads having a particle size ranging from about 10 to 1000 microns, and a microporous structure as evidenced by a reduced bulk density, typically from about 40 to 80 percent that of conventional non-porous polybenzimidazole; a specific surface area of at least about 10m$^2$/g, and preferably greater than 25m$^2$/g; a porosity of at least about 10 percent, and preferably at least 20 percent; and an average pore diameter of from about 50 to about 500 Angstroms, and preferably from about 75 to about 250 Angstroms.

Test methods useful in measuring the foregoing properties of the instant microporous polybenzimidazole beads are well known to those skilled in the art, and are described in detail in U.S. Pat. Nos. 4,257,997 and 4,290,987, the entirety of which are hereby incorporated by reference and relied on in their entirety. The particular specific surface area measurement technique employed herein comprises a multipoint BET surface area measurement using nitrogen as the absorbent gas, and degassing with helium at approximately 250° C. for 4.5 hours. The average pore diameter is calculated from the specific surface area by techniques well known to those skilled in the art.

The particular properties of a given batch of microporous polybenzimidazole particulates is a function of the specific procedures used in their preparation. Factors which have been found to effect such properties, where the emulsification-precipitation technique is employed, include the viscosity of the emulsion (which in turn is a function of the molecular weight of the polybenzimidazole resin, the concentration of polybenzimidazole in the the polybenzimidazole solution, and the concentration of pore-enhancing additives and surfactants); the shear conditions; polarity differences between the polybenzimidazole solution and the non-polar organic solvent; the time between emulsion formation and precipitation; temperature; and polarity of non-solvents used in the precipitation process. Factors which have been found to affect the properties of the microporous particulates where the atomizing, non-solvent quenching procedure is employed, include the pressure of atomization, the flow rate of the polybenzimidazole solution, the geometry and size of the nozzle, the viscosity of the polybenzimidazole solution, temperature of the quenching non-solvent, and the polarity differences between the polybenzimidazole solution and the quenching non-solvent. In addition, as noted above, in both of these procedures the presence of pore-enhancing additives promotes the formation of a macroreticular structure. Adjustment of these factors may be employed in order to obtain microporous particles having the desired characteristics.

C. Formation of the Polybenzimidazole Anion

This process essentially invovles mixing the polybenzimidazole particulate formed in the prior process with a solution of a suitably strong base to form the polybenzimidazole anion on the surface of the polybenzimidazole article. (Although the polybenzimidazole article disclosed is a particulate, it is understood that the process of the instant invention is adaptable for use with polybenzimidazole to fibers or films).

The strong base used in this process is selected from the group consisting of organic or inorganic bases of a sufficient strength to remove the hydrogen from the nitrogen on the imidazole ring and create a polybenzimidazole anion. Acceptable bases must have a pka of at least about 9 and may include hydroxides, alkoxides, orgonometallic bases and amides which form strong bases, including such compounds as sodium hydroxide, potassium hydroxide, lithium hydroxide, calcium hydroxide, sodium methoxide, sodium amide, butyl lithium, Grignard reagants and other strong bases of similar types. These bases are dissolved in a solvent which will enable them to act as a strong base, such as water for sodium hydroxide or methanol for sodium methoxide. Although aqueous solvents are useful, organic solvents such as methanol or toluene, are preferred because they do not interferingly react with the polybenzimidazole.

In a preferred embodiment the polybenzimidazole particulates are mixed with sodium methoxide in methanol and generate a polybenzimidazole anion as described below:

acted base, the polybenzimidazole particulate may be air dried. It is not crucial that all of the solvent be removed from the polybenzimidazole anion since the particulates are subsequently reimmersed in that solvent. However, all or substantially all of the excess strong base should be removed to prevent later, uncontrolled reaction with the metalloporphyrin.

D. Metalloporphyrin Complex Reaction

Metalloporphyrins are well known compounds comprised of a tetrapyrrole macrocycle attached to a multivalent metal usually with an oxidation state of +3 or higher. Commonly known metalloporphyrins include hemoglobin wherein the central metal is iron and chlorophyll wherein the central metal is magnesium. These compounds are frequently quite useful as oxygen absorbing and desorbing agents and as catalysts for epoxidation reactions and for the selective oxidation of alkanes, olefins and aromatic compounds.

The reaction of the instant invention essentially involves the mixing of the polybenzimidazole anion prepared from the process described above with a metalloporphyrin in solution. The metalloporphyrin solution is prepared by dissolving a metalloporphyrin salt in an

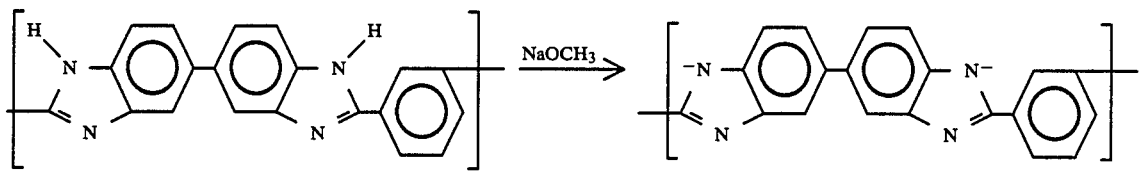

The concentration of the base in solution is important in the preparation of the polybenzimidazole anion. The higher the concentration of the base, the higher the disassociation of the hydrogen from the imidazole nitrogen and the higher the ultimate percentage of loading of the metalloporphyrin on the polybenzimidazole particulate, subsequently discussed. The molar ratios of the reactive group of the strong base to the imidazole hydrogen sites on the polybenzimidazole polymer should be at least about 1 to 1 to about 8 to 1. Although higher concentrations of base may be used, the percentage of loading of the metalloporphyrin on the polybenzimidazole polymer does not significantly improve and when very high concentrations (above about 10 to 1) are used, the polybenzimidazole polymer may be degraded. When ratios of less than about 1 to 1 of base are used, the percentage of substitution of the metalloporphyrin is reduced to less than about 0.1 percent of the available imidazole hydrogen sites. In a preferred embodiment, the molar ratio of the reactive group of the strong base to the imidazole hydrogen sites on the polybenzimidazole polymer should be about 5 to 1 to about 8 to 1.

The polybenzimidazole particulates mixed in the base solution are constantly stirred under an inert atmosphere such as argon gas, for a period from about 1 to about 10 hours under ambient or near ambient conditions. In a preferred embodiment, a polybenzimidazole/sodium methoxide mixture is stirred under argon gas for a period of about 3 to 6 hours at about 25° C. The mixture is then vacuum filtered and rinsed with a solvent for the base to eliminate any unreacted base. The preferred solvent is that solvent used for the dissolution of the metalloporphyrin complex as will be described hereafter. After the polybenzimidazole particulates are filtered and washed to remove all of the unreorganic solvent for that salt such as methanol, toluene, benzene, hexane or other hydrocarbon solvents, which do not interferingly react with the polybenzimidazole anion previously produced. Sufficient solvent is added so that there is a complete or virtually complete dissolution of the metalloporphyrin in the solvent. Preferred metalloporphyrin salts include halide salts or other such salts in which the anion is not bound strongly to the metalloporphyrin ring. Preferable salts include iron octaethylporphyrin chloride, chromium octaethylporphyrin chloride and manganese octaethylporphyrin chloride.

Suitable transition metals for the metalloporphyrin salt include transition metals with an oxidation state of +3 or higher selected from groups VIA, VIIA, VIII, VIIIA, IB, and IIIB of the fourth to the sixth periods of the periodic table including chromium, manganese, iron, nickel, cobalt, gold, platinum, iridium and rhodium. The preferable metal is selected from the group consisting of chromium, manganese, iron, cobalt, rhodium and nickel and most preferably from the group consisting of manganese, chromium, iron and rhodium. In a particularly preferred embodiment, the metalloporphyrin salt is chromium octaethylporphyrin chloride.

The polybenzimidazole anion formed in the prior process is mixed with the metalloporphyrin solution. Sufficient polybenzimidazole particulates are added so that at least a stoichiometric quantity of the reactive metalloporphyrin is present for each polybenzimidazole imidazole anion present. The polybenzimidazole particulates must not dissolve in the porphyrin solution. The mixture is continually stirred under an inert gas for a period of from about 1 to 24 hours. In a preferred embodiment, the mixture is stirred for about 2 to 5 hours under argon gas.

The solution is then filtered and washed to remove any unreacted metalloporphyrin. The polybenzimidazole particulates filtered from the solution are washed with a solvent for the specific metalloporphyrin which has been employed such as methanol, toluene, benzene, hexane or other appropriate solvents. The metalloporphyrin complex supported on the polybenzimidazole particulate thus formed may then be further washed with dichloromethane until all or substantially all of the unreacted metalloporphyrin is removed. During the washing, the solvent wash may be analyzed by conventional analytical techniques, such as ultraviolet-visible or electronic spectroscopy, to determine whether substantially all of the excess metalloporphyrin complex has been removed.

The metalloporphyrin complex supported on a polybenzimidazole particulate is then dried by heating it at a temperature of about 50° C. to about 125° C. for a period of about 1 to about 12 hours. In a preferred embodiment the metalloporphyrin complex supported on a polybenzimidazole particulate is dried at a temperature of about 75° C. to about 100° C. for about 3 to about 7 hours.

The metalloporphyrin complex supported on polybenzimidazole particulates formed from this reaction can be analyzed to determine the amount of metalloporphyrin that had been bound to the polybenzimidazole particulates. The analysis can be performed by dissolving the metalloporphyrin complex supported on a polybenzimidazole particulate in a solvent for polybenzimidazole such as N,N-dimethylacetamide, N,N-dimethylformamide, dimethylsulfoxide, or N-methyl-2-pyrrolidone. In a preferred embodiment the metalloporphyrin complex supported on a polybenzimidazole complex is dissolved in N-methyl-2-pyrrolidone and analyzed by electronic spectroscopy. With a concentration of base, from about a 5 to about 8 equivalents per reactive imidazole hydrogen, the percentage, by weight, of metal in the polybenzimidazole/metalloporphyrin complex is about 0.1 to about 1 percent. The higher the concentration of the base, the greater the percentage of metalloporphyrin substitution and the greater the utility of the end product. However, as previously stated, concentrations of base in excess of about a 10 equivalent concentration may have an adverse impact on the structure of the polybenzimidazole.

E. Alternative Metalloporphyrin Reaction

An alternative method for supporting the metalloporphyrin on the polybenzimidazole particulates does not require the treatment of the polybenzimidazole particulate with a base. In this alternative method, the metalloporphyrin in the form of a salt is dissolved in a solvent for that metalloporphyrin to form a weak anion salt. The solvent is selected from the group consisting of chloroform, dichloromethane, methanol or similar organic solvents which easily dissolve the metalloporphyrin salt without interferingly reacting with a polybenzimidazole polymer.

The metalloporphyrin salt used in this alternative procedure is a combination of a transition metal (which is selected from the group previously discussed) and a weak anion selected from the group consisting of tetrafluoroborate ($BF_4^-$) hexafluorophosphate ($PF_6^-$) hexafluoroantimonate ($SbF_6^-$) or perchlorate ($ClO_4^-$). In a preferred embodiment the metalloporphyrin salt is an octaethyl porphyrin manganese tetrafluoroborate. By mixing the metalloporphyrin salt, dissolved in solution, with the polybenzimidazole particulates for about 2 to about 10 days the imidazole hydrogen on the polybenzimidazole polymer is displaced by the dissociated cation of the metalloporphyrin group to form a metalloporphyrin complex supported on the polybenzimidazole particulate. Following formation of the complex, the solution is filtered and washed as previously described. Using this alternative procedure, the porphyrin substitution obtained is only about 10 percent of that obtained by the previously discussed method. By using this alternative method porphyrin substitutions in the range of about 0.01 to about 0.1 percent can be obtained.

Metalloporphyrins supported on a polybenzimidazole particulate may be employed as heterogeneous catalysts in either the slurry or vapor phase. Further, by binding the metalloporphyrin to the polybenzimidazole particulates, the metalloporphyrin, when used as a catalyst, can easily be recycled by filtration.

The activity of the metalloporphyrin complex itself is also improved by binding it to the polybenzimidazole because the metalloporphyrin is immobilized on the polybenzimidazole particulate and prevented from oxidizing itself. Since unbound metalloporphyrins tend to dimerize under oxidizing conditions, their utility as a catalyst is limited. An additional advantage gained by complexing the metalloporphyrin with the imidazole group of the polybenzimidazole is the enhanced activity of the metalloporphyrin catalyst. The combination of the immobilization of the metalloporphyrin and the enhanced activity of metalloporphyrin results in surprising increases in the levels of oxidation in the range of 8 to 48 fold.

Metalloporphyrin complexes supported on polybenzimidazole particulate can be quite useful as a heterogeneous catalyst for selective oxidation of alkanes, olefins and aromatic compounds and for the epoxidation of cyclohexenes. The metalloporphyrins may also be bound to polybenzimidazole films which can be quite useful in the purification or enrichment of gas mixtures, especially where the level of oxygen is an important consideration. As an additional application, these materials can act as separation membranes for proteins or peptides by affinity chromatography.

The following examples are given as specific illustrations of the invention. Unless otherwise stated, all quantities are by weight based on the total weight of the compound. It should be understood, however, that the invention is not limited to the specific details set forth in the examples.

EXAMPLES

Example 1

200 ml. of a poly-2,2'-(m-phenylene)-5,5'-bibenzimidazole solution containing 6 percent by weight of a polybenzimidazole resin dissolved in concentrated sulfuric acid (98 percent by weight $H_2SO_4$) were emulsified with 600 ml of octane in a blender at an agitation speed of approximately 1000 rpm. A homogeneous dispersion of polybenzimidazole beads resulted. The emulsion was thereafter quickly quenched with 600 ml of methanol to precipitate the polybenzimidazole polymer beads. The resulting substantially spherical, beads were collected by filtration, washed with isopropanol, and then dried in a vacuum oven at 75° C. for 12 hours. The polybenzimidazole beads exhibited a substantially spherical shape and ranged in size from 20 to 500 microns. Scanning electron microscopy studies of the beads indicated that the beads were microporous. The beads had a surface area of approximately 30m²/g and a water content of 15 percent.

In a separate container 5.0 grams of sodium metal were dissolved in 400 mls. of methanol. To this solution were added 5.0 grams of the polybenzimidazole beads prepared above. The beads were stirred in the solution under argon gas for approximately 1 hour, vacuum filtered, and rinsed with methanol to remove any unreacted sodium methoxide.

The resulting polybenzimidazole beads were then added to a solution containing 0.05 gm. of iron octaethylporphyrin chloride dissolved in 200 ml. of toluene. This mixture was stirred under argon gas for approximately 12 hours, filtered, washed with methanol, and then dried in a vacuum oven at 75° for 5 hours. The material produced by this procedure was washed a second time with approximately 10 ml of dichloromethane, dried under a vacuum, and analyzed by ultraviolet spectroscopy. The color of the material was now red/brown. Ultraviolet-visible spectroscopy showed that the porphyrin was chemically bound to the polybenzimidazole beads. The yield of iron octaethylporphyrin polybenzimidazole equaled 5.0 gms. showing 0.17 weight percentage iron.

Example 2

The process of Example 1 was carried out using 0.05 g. of chromium octaethylporphyrin chloride, rather than the iron porphyrin which was in turn combined with 0.17 g. polybenzimidazole particulates. The ultraviolet-visible spectroscopy indicated that the chromium octaethyl porphyrin complex had also been bound to the polybenzimidazole polymer. The yield of chromium octaethylporphyrin polybenzimidazole was 0.16 g. (0.18 weight percentage chromium).

Example 3-6

In a process similar to that employed in Example 1, metalloporphyrin complexes were supported on polybenzimidazole porous beads as shown in the following table:

| EX | PORPHYRIN[4] | WT. % METAL[1] | μMOLES/ GRAM[2] | ANALYSIS METHOD[3] |
|---|---|---|---|---|
| 3. | OEP.MnCl | 0.30 | 54.6 | ICP |
| 4. | OEP.MnCl | 0.37 | 67.3 | ICP |
|   |   | 0.44 | 80.1 | UV-Vis |
| 5. | OEP.RhCl | 0.71 | 68.8 | UV-Vis |
| 6. | OEP.MnBF₄ | 0.02 | 4.3 | UV-Vis |

[1] Percentage by weight of metal in the polybenzimidazole-metalloporphyrin complex.
[2] Micromoles of metalloporphyrin per gram of polybenzimidazole-metalloporphyrin complex.
[3] Analytical method used to determine the metal loading of polybenzimidazole. UV-visible spectroscopy involves dissolving the material in N—methylpyrrolidinone and using the absorbance of the Soret band with the extinction coefficient determined on the unbound metalloporphyrin. Quantitative ICP (Inductively coupled plasma emission spectroscopy) determinations of metals on polybenzimidazole beads were also run.
[4] Octaethyl porphyrin (OEP) metal salt.

Example 7-16

To gauge the activity enhancement of the instant invention, cyclohexene epoxidation reactions were carried out comparing the amount of the product produced when the porphyrin was merely dissolved in solution unbound to the polybenzimidazole, with the amount of product produced when the metalloporphyrin was bound to polybenzimidazole particulate. In the epoxidation reaction, cyclohexene was reacted with either iodosylbenzene or sodium hypochlorite with the metalloporphyrin in dichloromethane acting as the catalyst. The activity enhancement is shown by the following table:

| | OXIDATION OF CYCLOHEXENE CATALYZED BY PORPHYRINS SUPPORTED ON POLYBENZIMIDAZOLE[1] | | | | | | | |
|---|---|---|---|---|---|---|---|---|
| EX[2] | CATALYST[8] | (μmoles) | PTC[3] | μmole | μmole[4] | T.O.[5] | SELECT[6] | FACTOR[7] |
| | SODIUM HYPOCHLORITE | | | | | | | |
| 7. | OEP.MnCl | 3.6 | TBA | 19.27 | 0.207 | 57.5 | 8-67-25 | 3.7 |
| 8. | OEP.MnCl | 2.7 | CTAB | 19.76 | 0.512 | 189.6 | 24-59-17 | 5.5 |
| 9.[2] | OEP.MnBF₄ | 0.2 | TBA | 19.39 | 0.264 | 660.0 | 22-56-22 | |
| 10. | OEP.FeCl | 1.5 | TBA | 20.00 | 0.234 | 156.0 | 15-57-28 | 47.3 |
| 11. | OEP.FeCl | 1.4 | CTAB | 19.76 | 0.569 | 406.4 | 21-62-17 | |
| 12.[2] | OEP.CrCl | 1.6 | TBA | 19.36 | 0.509 | 159.1 | 16-61-23 | 31.8 |
| 13. | OEP.RhCl | 3.6 | TBA | 19.51 | 0.206 | 57.2 | 13-64-23 | |
| | IODOSYLBENZENE | | | | | | | |
| 14. | OEP.MnCl | 4.1 | — | 19.27 | 0.101 | 24.6 | 21-37-42 | 10.7 |
| 15. | OEP.FeCl | 1.5 | — | 19.76 | 0.064 | 42.7 | 14-86-0) | 42.7 |
| 16. | OEP.CrCl | 1.6 | — | 19.27 | 0.059 | 18.2 | 13-87-0) | 16.8 |

[1] All results obtained after one hour unless otherwise noted.
[2] Data taken after 2 hours.
[3] Phase Transfer Catalysts: TBA - Tetra-n-butylammonium iodide. CTAB - Cetyltrimethylammonium bromide.
[4] Total μmoles of all three cyclohexene oxidation products.
[5] Turnover: μmoles of product per μmoles of catalyst per hour.
[6] Selectivities (%) to cyclohexene oxide, cyclohex-2-ene-1-ol and cyclohex-2-ene-1-one. Data in parentheses represent turnover and selectivity obtained with the unbound catalyst in solution.
[7] Enhancement factor: The ratio of product turnover obtained with unbound porphyrin and that obtained with the polybenzimidazole-bound porphyrin.
[8] Octaethyl porphyrin (OEP) metal salt.

Example 17

Using the alternative method for supporting a metalloporphyrin on polybenzimidazole polymer beads, 28 mg. (0.04 micromoles) of octaethyl porphyrin manganese tetrafluoroborate was dissolved in 40 ml. dichloromethane in a 125 ml. Erlenmeyer flask. One gram of polybenzimidazole beads was added and the mixture was stirred for 48 hours. The beads were collected by filtration, placed in an extraction thimble and washed with dichloromethane for two hours. The beads were recovered and dried. Ultraviolet and physical spectroscopy revealed a porphyrin loading of 0.2 weight percentage (4.3 micromoles per gram of the octaethylporphyrin manganese/polybenzimidazole complex.)

As is apparent from these examples, metalloporphyrin complexes can be bound to polybenzimidazole articles. These metalloporphyrin complexes bound to polybenzimidazole articles exhibit activity enhancement as disclosed by the cyclohexene epoxidation reactions. The increase in reactivity over unbound metalloporphyrin was by a factor from about 3 to 1 to about 50 to 1. The natural stability of the polybenzimidazole articles combined with the activity enhancement creates a quite useful microporous polybenzimidazole catalyst. Similar types of reactive enhancement should be present with other types of polybenzimidazole/metalloporphyrin complexes.

What is claimed is:

1. A process for the production of a microporous polybenzimidazole article onto which a metalloporphyrin complex has been bound comprising:
   (a) preparing a microporous polybenzimidazole shaped article;
   (b) reacting the microporous polybenzimidazole article with a strong base to produce a polybenzimidazole anion on the surface of the article; and
   (c) mixing the anionized polybenzimidazole article with a metalloporphyrin salt solution to form a microporous polybenzimidazole article supporting a metalloporphyrin complex.

2. A process for the production of a polybenzimidazole article onto which a metalloporphyrin complex has been bound comprising:
   (a) preparing a microporous polybenzimidazole particulate wherein the polybenzimidazole polymer is characterized by recurring monomeric units of:

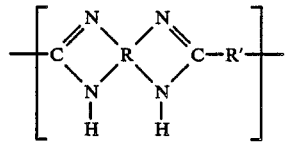

wherein R is a tetravalent aromatic nucleus, with the nitrogen atoms forming the benzimidazole rings paired adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene and (f) pyran;
   (b) reacting the microporous polybenzimidazole particulate with a solution of a strong base with a pka of at least about 9 to produce a polybenzimidazole anion on the surface of the polybenzimidazole particulate; and
   (c) mixing the anionized, microporous polybenzimidazole particulate with a metalloporphyrin salt solution, wherein the metal of the metalloporphyrin is selected from the group consisting of chromium, manganese, iron, cobalt, rhodium and nickel, to form a microporous polybenzimidazole particulate supporting a metalloporphyrin complex.

3. A process for the production of a polybenzimidazole article onto which a metalloporphyrin complex has been bound comprising:
   (a) preparing a microporous polybenzimidazole particulate wherein the polybenzimidazole polymer is poly-2,2-(m-phenylene)-5,5-bibenzimidzole;
   (b) reacting the microporous polybenzimidazole particulate with sodium methoxide with a pka of at least about 9 to produce a polybenzimidazole anion on the surface of the polybenzimidazole particulate; and
   (c) mixing the anionized microporous polybenzimidazole particulate with an iron metalloporphyrin salt to form a microporous, polybenzimidazole particulate supporting an iron metalloporphyrin complex.

4. The process as in any of claims 2 or 3 wherein the particulates have a porosity of at least about 10 percent.

5. The process as in any of claims 2 or 3 wherein the particulates have a specific area of at least about 10m$^2$/g and an average pore diameter of from about 50 to about 500 Angstroms.

6. The process as in any of claims 1 or 2 wherein the strong base is selected from the group consisting of alkali metal hydroxides, hydrides, $C_1$–$C_6$ alkoxides and other bases having a pka of at least about 9.

7. The process of claim 6 wherein the strong base is sodium methoxide.

8. The process as in any of claims 1 or 2 wherein the ratio of the equivalents of strong base anion to polybenzimidazole imidazole group equivalent is from about 1 to to 1 to about 8 to 1.

9. The process as in any of claims 1 or 2 wherein the ratio of the equivalents of the strong base anion to the polybenzimidazole imidazole group equivalent is from about 5 to 1 to about 8 to 1.

10. The process as in any of claim 2 or 3 wherein the microporous polybenzimidazole polymer particulate/strong base solution is reacted under an inert atmosphere for a period of about 1 to about 10 hours.

11. The product produced in accordance with the process of claim 1.

12. The product produced in accordance with the process of claim 2.

13. The product produced in accordance with the process of claim 3.

14. A catalyst comprised of a metalloporphyrin bound through its metal cation to a polybenzimidazole article.

15. The product of claim 14 wherein the polybenzimidazole article is a particulate.

16. The product of claim 14 wherein the polybenzimidazole article is a film.

17. The product of claim 14 wherein the metal of the metalloporphyrin salt is selected from the group consisting of metals belonging to groups VIA, VIIA, VIII, VIIIA, IB, and IIIB of the fourth to the sixth periods of the periodic table.

18. The product of claim 14 wherein the metal of the metalloporphyrin is selected from the group consisting of chromium, manganese, iron, cobalt, rhodium and nickel.

19. The product of claim 14, wherein the metal of the metalloporphyrin is iron.

20. A process for the production of a microporous polybenzimidazole article onto which a metalloporphyrin complex has been bound comprising:

(a) preparing a microporous polybenzimidazole shaped article; and (b) mixing the polybenzimidazole shaped article with a metalloporphyrin salt solution to form a microporous polybenzimidazole article supporting a metalloporphyrin complex.

21. The process as in any of claims 1, 2, 3 or 20 wherein the polybenzimidazole article is a particulate.

22. The process as in any of claims 1 or 20 wherein the polybenzimidazole article is a film.

23. The process as in any of claims 1 or 20 wherein the polybenzimidazole article is a fiber.

24. The process as in any of claims 1, 2, 3 or 20 wherein the metal of the metalloporphyrin salt is selected from the group consisting of metals belonging to groups VIA, VIIA, VIII, VIIIB, IB, and IIIB of the fourth to the sixth periods of the periodic table.

25. The process of claim 24 wherein the metal of the metalloporphyrin is selected from the group consisting of chromium, manganese, iron, cobalt, rhodium and nickel.

26. The process as in any of claims 1, 2 or 20 wherein the metal of the metalloporphyrin is iron.

27. The process as in any of claims 1 or 20 wherein the polybenzimidazole polymer consists essentially of recurring units of the formula:

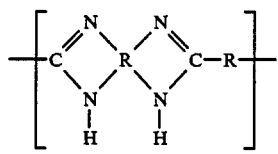

wherein R is a tetravalent aromatic nucleus, with the nitrogen atoms forming the benzimidazole rings paired adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene and (f) pyran.

28. The process as in any of claims 1 or 20 wherein the polybenzimidazole polymer consists essentially of recurring units of the formula:

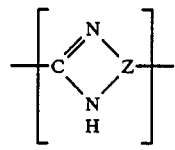

wherein Z is an aromatic nucleus having the nitrogen atoms forming the benzimidazole rings paired upon adjacent carbon atoms of said aromatic nucleus.

29. The process as in any of claims 1 or 20 wherein the polybenzimidazole polymer is poly-2,2'-(m-phenylene)-5,5'-bibenzimidazole.

30. The process as in any of claims 1, 2, 3 or 20 wherein the solvent for the metalloporphyrin is selected from the group consisting of chloroform, dichloromethane, methanol, toluene, benzene, hexane and ethanol.

31. The process of claim 30 wherein the solvent for the metalloporphyrin salt is dichloromethane.

32. The process of claim 20 wherein the anion of the metalloporphyrin salt is selected from the group consisting of tetrafluoroborate, hexafluorophosphate, hexafluoroantimonate and perchlorate.

33. The process of claim 20 wherein the anion of the metalloporphyrin salt is tetrafluoroborate.

34. The process of claim 20 wherein the metalloporphyrin salt is octaethylporphyrin manganese tetrafluoroborate.

35. The process of claim 20 wherein the polybenzimidazole articles and the metalloporphyrin solution are mixed for 48 to 240 hours.

36. The process as in any of claims 1, 2, 3 or 20 wherein about 0.01 to about 1 percent of the imidazole nitrogen sites on the polybenzimidazole article are bound to the metalloporphyrin.

37. The product produced in accordance with the process of claim 20.

* * * * *